United States Patent [19]
Cathers

[11] 3,771,680
[45] Nov. 13, 1973

[54] GLASS TURNOVER AND PACKING DEVICE

[75] Inventor: William P. Cathers, Allison Park, Pa.

[73] Assignee: PPG Industries, Inc., Pittsburgh, Pa.

[22] Filed: May 9, 1972

[21] Appl. No.: 251,625

Related U.S. Application Data

[62] Division of Ser. No. 76,085, Sept. 28, 1970, Pat. No. 3,675,788.

[52] U.S. Cl. ................................................ 214/152
[51] Int. Cl. ........................................... B65g 47/24
[58] Field of Search ................... 214/1 Q, 152, 6 C, 214/6 P, 7, 1 S

[56] References Cited
UNITED STATES PATENTS
1,847,812  3/1932  Burton et al. ........................... 214/7
1,128,671  2/1915  Evans .............................. 214/6 C X FOREIGN PATENTS OR APPLICATIONS
239,112  7/1964  Austria ............................... 214/6 C Primary Examiner—Gerald M. Forlenza
Assistant Examiner—Frank E. Werner
Attorney—Russel A. Eberly

[57] ABSTRACT

An L-shaped member is used for placing horizontal stacks of glass in a substantially vertical position in an L-shaped frame such as a pallet or an L-skid. The glass is transferred from a packing machine by a roller conveyor to the L-shaped member. The L-shaped frame is placed upside down around the glass and the member is rotated between about 91° and 100° so that the glass is in a substantially vertical position resting on edge in the L-shaped frame.

3 Claims, 6 Drawing Figures

GLASS TURNOVER AND PACKING DEVICE

This is a division, of application Ser. No. 76,085, filed Sept. 28, 1970, now U.S. Pat. No. 3,675,788.

BACKGROUND OF THE INVENTION

1. Field of the Invention

This invention relates to a means in the automatic glass packing system for rotating horizontal stacks of flat glass to a substantially vertical position and simultaneously placing an L-shaped frame member on the glass in preparation for closing and shipping.

2. Description of the Prior Art

In the handling of sheets of glass, it has been customary to use an apparatus which comprises a conveyor-belt line, atop which pieces of flat glass ride and from which various personnel lift the pieces of glass and stack them, as necessary, against a conventional A-frame, or against a selected one of a plurality of such frames. As needed, the workers involved use, as well as their hands, also their feet. A source of loss comprises the generation of scratches in an adjoining piece of glass that has been so manually stacked.

The use of means per se for rotating articles for convenience in handling is known. In this connection, reference may be made to Jauch, U.S. Pat. No. 1,498,732; and Schlothan, U.S. Pat. No. 1,660,016.

The Jauch patent discloses, for example, "a truck is utilized consisting of a platform 49 mounted upon casters 50 and having fixed beneath the platform a pair of sockets 51 that are open at one side of the platform for reception of the brackets 8 that extend from the tilting table. A pair of vertically disposed stakes 52 extend upwardly from that side of the platform of the truck opposite the sockets." The Jauch patent also states "Upon the truck is loaded a stock of soap prepared in slabs 53 arranged horizontally in vertical succession, and while the tilting table is in vertical position the loaded truck is positioned so that the brackets 8 extend into its sockets. The tilting table is then turned to its horizontal position by turning on the power which actuates its driving mechanism."

The Schlothan patent discloses, for example, "certain objects of the invention are to provide a truck whereby as many as 7, 8 or 9 boxes of goods may be readily and easily moved from place to place and piled or stacked at one time by one man. Further objects are to provide a truck having a double pivotal movement so that the roller body which carries the load will swing easily and lightly to the floor and back again to a horizontal position."

SUMMARY OF THE INVENTION

This invention relates to a glass turnover and packing device comprising:
 a carriage,
 an L-shaped member having a first section and a second section extending in a direction that is approximately normal to said first section,
 pivot means on said member for connecting said member to said carriage,
 means for rotating said member about an angle of approximately 90° from a position wherein said first section extends approximately horizontally to another position wherein said first section extends approximately vertically, and
 means for preventing the glass from falling off of said L-shaped member due to a gravitational effect.

According to the present invention, an apparatus for and a method of handling sheets of flat glass, and even window glass, involves the conveying of pieces of glass concerned along a line wherein the pieces of glass are held against gravity in the lower run of a vacuum belt-conveyor. Suitable vacuum equipment is available commercially, such as that developed by the Wise Machine Company, of Butler, Pennsylvania.

In accordance with the embodiment of the present invention, an endless vacuum conveyor-belt line has, for example, four or six stations, and there is provided an operator who is able, by pressing certain control buttons, to consign pieces of glass, as desired, to any selected station. The glass is grapsed by means of a vacuum-belt conveyor device of the endless-belt variety, with the vacuum operating upon the lower run of the endless conveyor belt, and with the vacuum being momentarily released, as desired and at the proper time, in accordance with the indications provided by the operator. This provides a method of causing pieces of glass to become stacked while they are oriented horizontally.

In accordance with the present invention, there is used a vacuum-type conveyor line of the kind wherein it is possible to release the vacuum at a preselected location, in accordance with the indications provided by an operator. When six stations are used, the first station could be a cullet bin; the second station could be for the receipt of sheets of glass of contract grade; and the fourth station could be for the receipt of pieces of glass of replacement grade. If the second station becomes full, then the third station could be used until it becomes full. Similarly, replacement-grade could be received by either the fourth or the fifth station. The sixth station could be used to receive glass that needs to be cut to smaller sizes. Of course, the number of stations can vary and it is very possible to eliminate, for example, the third and the fifth stations.

In accordance with the invention, some or all of the stations are provided with the capability that the glass thereon which has been inspected previously and marked with chalk to indicate the glass condition, may be moved transversely with respect to the direction of the vacuum-type conveyor line by means of which the glass is conveyed to such a station and then, as desired, suitably lowered or dropped. Instead of six to eight people who look at the pieces of glass put out by, for example, a float line and then pick them up and stack them onto suitable A-frames in accordance with their various characteristics (such as contract grade, replacement grade, or recut), there will be one operator who looks at all of the chalk-marked glass and consigns them, by means of automatic equipment, to a cullet bin or one of the other stations mentioned above.

In accordance with the present invention, the handling of glass involves a stacking of glass into a pile of horizontally oriented sheets and this is not customary in glass handling.

In accordance with the present invention, means are provided for handling the glass that has been stacked horizontally at a plurality of stations along the line. At each of the stations, except for perhaps the cullet bin, there is provided a plurality of driven conveyor rolls that can be operated to cause the glass to be moved transversely of the conveyor line. There may also be used, a set of driven conveyor rolls intermediate the conveyor line and a receiving line. The receiving line comprises a carriage that rides upon rails and has also, mounted in it, at a location that can be brought into alignment with the conveyor rolls of the vacuum-type handling line and if desired or necessary, the intermediate handling line mentioned above. The carriage comprises a base that rides on the rails and has in it a suitably horizontally extending pivot means, in operative connection with which there is mounted a member, generally L-shaped, a horizontal portion of which contains the above-mentioned driven rolls that receive the glass from the intermediate-conveying means if such means is used. The generally L-shaped member is capable of being rotated about the above-mentioned pivot means by about 91° to 100°, and preferably about 95°, such that by the operation of such a pivoting, a stack of glass is set on edge. There may, for example, be provided suitable hydraulic means for effecting the change of 91° to 100° about the pivot means in the position of the above-mentioned L-shaped member.

After the glass is conveyed onto the carriage by means of the above-mentioned sets of driven rolls, there is placed over the glass a generally L-shaped frame which can be either an L-skid or a pallet. This L-shaped frame contacts the top of the stack of the horizontally extending glass sheets and the side thereof that lies nearest to the then vertical side of the generally L-shaped member that has been mentioned above as being pivotally connected and located on said carriage. Then, by suitable acting hydraulic means or the like, the L-shaped member on the carriage is caused to rotate at least 91°, thereby tipping the stack of glass sheets on edge while contacting the frame. The formerly vertically extending side of the frame now forms a bottom for the on-edge stack of glass sheets, and it is preferable at this point to band the stack of glass sheets, as, for example, by applying two horizontally extending sets of steel strapping and three vertically extending sets about the stack.

In accordance with a preferred embodiment of the present invention, hydraulic means are provided for positioning the horizontally extending glass sheets before they are rotated to a vertical position. This means can be, for example, a hydraulically operated, vertically extending roller section that contacts the vertically extending portion of the L-shaped frame so that the frame does not shift its position during its rotation.

The stack of glass sheets thus handled may be, for example, about three tons in weight, comprising about 200 to 250 uncut windshield blanks, each one-eighth inch in thickness and having overall dimensions such as 33 inches by 95 inches.

The banded stack of glass sheets, set on edge, is then removed from the L-shaped member of the carriage by means of a fork lift truck that preferably operates upon the stack of sheets, after they have been banded, by coming in under them after the carriage has been taken to the end of its run that is most distant from the portion of the vacuum-conveyor line that initially receives the glass sheets.

DESCRIPTION OF THE DRAWINGS

A complete understanding of the invention may be obtained from the foregoing and following description thereof, taken together with the appended drawings which are not to scale, in which.

DESCRIPTION OF THE PREFERRED EMBODIMENT

Figure 1:
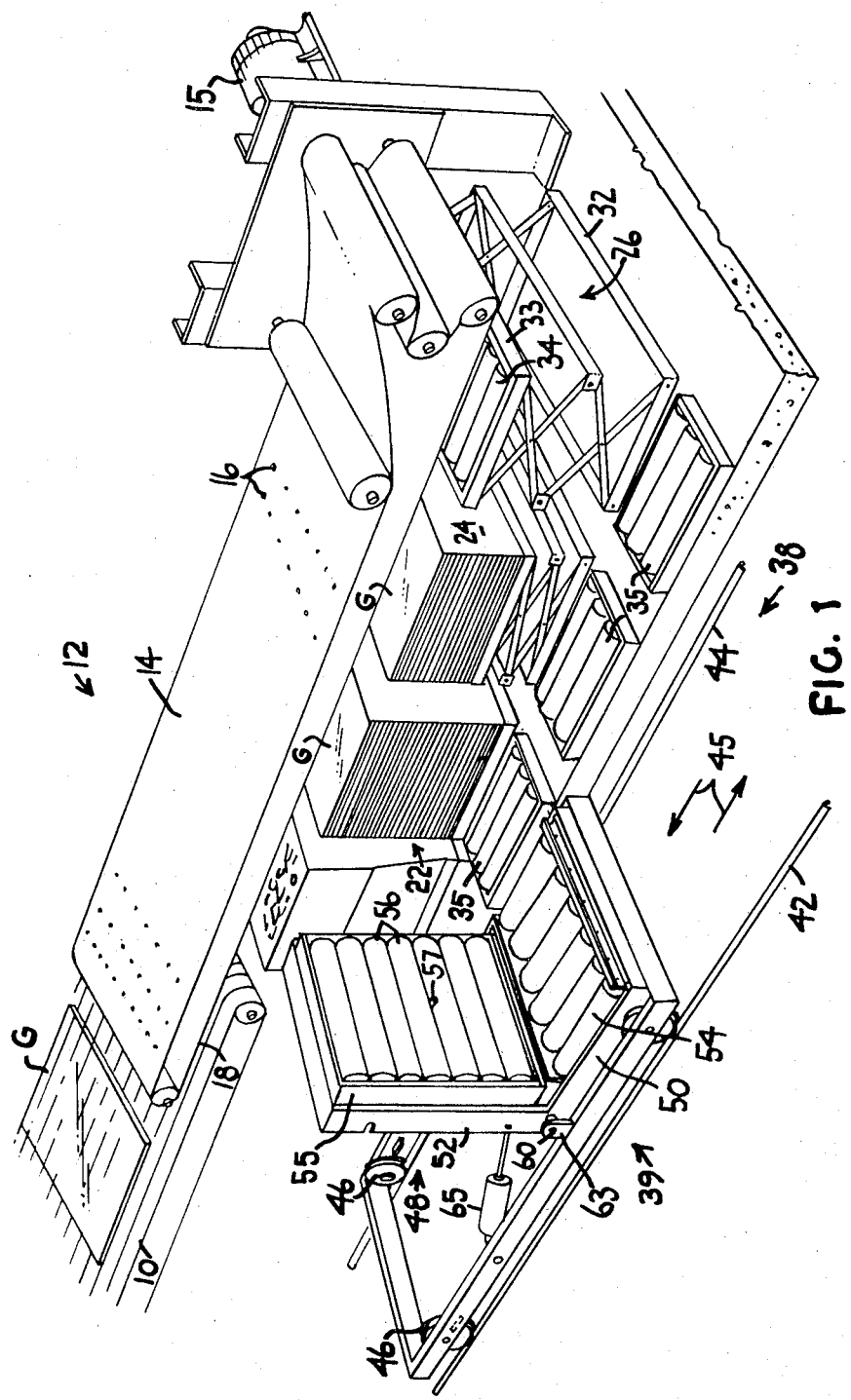
FIG. 1 is a prospective view of the apparatus used in the present invention to handle sheets of glass.

Referring to FIG. 1, there is shown an apparatus for handling sheets of glass in accordance with the present invention. In FIG. 1, a sheet of previously inspected glass G is carried by a conveyor 10 from a production source such as a float line or from a storage area. Conveyor 10 carries the glass to a vacuum-type conveyor line 12 which carries glass G to an intended station.

Conveyor 12 has an apertured conveyor belt 14 which is driven by any suitable means, such as drive unit 15. Belt 14 has holes 16 that provide a suitable suction to hold glass G on the lower surface 18 of the lower run of belt 14. Beneath the lower surface 18 of the conveyor belt 14 are a plurality of stations, indicated as 20, 22, 24 and 26 in FIG. 1. It is to be understood that the number of stations will depend on the particular environment in which the apparatus is to be used, and four stations have been illustrated only as an example. Actually, six stations are a convenient number, but FIG. 1 has been limited to four stations due to space considerations.

In the illustrated example, the first station 20 is a cullet bin; the second station 22 is for the receipt of sheets of glass of contract grade; the third station 24 is for the receipt of pieces of glass of replacement grade; and, the fourth station 26 is used to receive glass that needs to be cut to a smaller size. It is often convenient to add alternate stations for at least the second and third stations, so that as the second station, for example, becomes full, the operator can cause glass sheets to be placed immediately on the alternate second station without waiting for the glass already at the second station to be removed to a receiving line.

At each of the stations there is a hydraulic scissor lift 32 that supports a frame 33 which houses driven conveyor rolls 34. The latter are disposed below the lower run of the apertured conveyor belt 14. Normally, conveyor rolls 34 receive a glass sheet as it is released from the bottom surface 18 of conveyor belt 14 by the operator. Sometimes, a spacer (not shown) will be provided on conveyor rolls 34 to keep the glass sheets away from a conventional scissor lift motor. Note that the driven conveyor rolls 34 extend in a direction that provides a path of movement that is transverse to the line of movement of conveyor 14. Conveyor rolls 34 should be kept within 5 inches of the surface 18 of the conveyor belt 14 to avoid breakage of the glass as it is dropped, although the distance is preferably between about two and three inches. As additional sheets of glass are dropped onto conveyor rolls 34, a suitable control system (not shown) will cause frame 33 to be lowered with each sheet of glass, thereby causing frame 33 to move downward. Such a suitable control system could be an electric eye that senses each sheet of glass as it is added to a stack and causes the lift 32 and therefore the frame 33 to be lowered, preferably by an increment approximately equal to the thickness of the glass sheets, thus keeping the distance between surface 18 and the top surface of the top sheet of glass approximately constant. More important, it keeps the distance to within about two to three inches.

When one of the stations becomes full, such as station 22 in FIG. 1, the operator will cause the stack of glass at that station to be moved to a receiving line 38. The latter is disposed to one side of the stations 20, 22, 24, 26, etc. A turnover device 39 comprising a carriage 40 is movable on tracks 42 and 44 in the direction of arrows 45 via four wheels 46 which are powered, for example, by motor 47. FIG. 1 illustrates the turnover device 39 in position to receive the stack accumulated at station 22. The turnover device 39 includes a carriage 40 and an L-shaped member 48, which comprises a first section 50 shown extending horizontally and a second station 52 shown extending vertically. When one of the stations becomes full, the carriage is moved along rails 42 and 44 until the generally L-shaped member 48 is aligned with the full station, such as station 22 in FIG. 1. Driven conveyor rolls 34 then move the glass onto the L-shaped member 48 with the aid of driven conveyor rolls 54 on the first section 50 of L-shaped member 48.

In certain circumstances, it may not be practical, due to space considerations, to position the receiving line 38 immediately adjacent the stations. Under such circumstances, it is possible to position a set of intermediate driven conveyor rolls 35 between the rolls 34 on the hydraulic scissor lifts 32 and the rolls 54 on the L-shaped member 48 in the plane occupies by the rolls 54 when the scissor lifts are lowered to their lowermost position at each of the stations.

Figure 2:
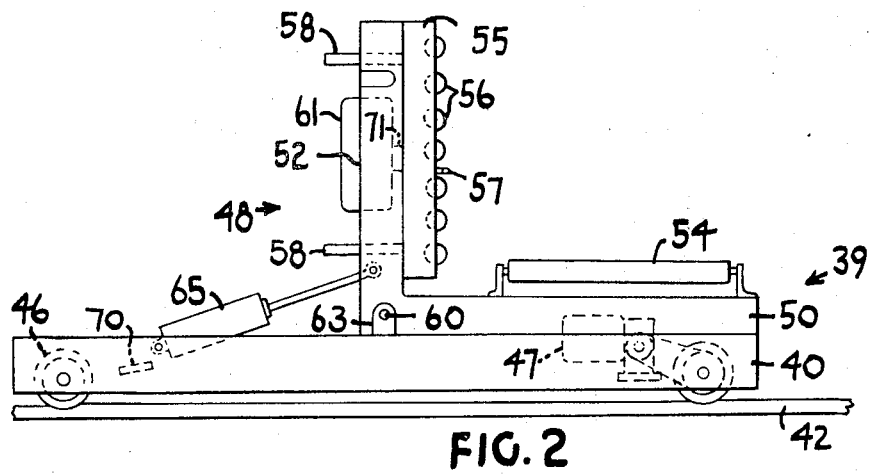
FIG. 2 is a side view of the glass turnover and packing device before the glass sheets have been stacked on the device.

Referring to FIG. 2, there is shown an isolated view of the turnover device 39 before the glass has been placed on the L-shaped member 48. Mounted on the second portion 52 of the L-shaped member 48 is a movable platform 55 with driven rollers 56 and a pressure sensing switch 57 for detecting contact of the glass sheets with rollers 56. A plurality of guide arms 58 are rigidly attached to platform 55 and extend through holes 59 in the second section 52. The operation of platform 55 will be further described in connection with FIGS. 4 and 5 hereinbelow.

Figure 3:
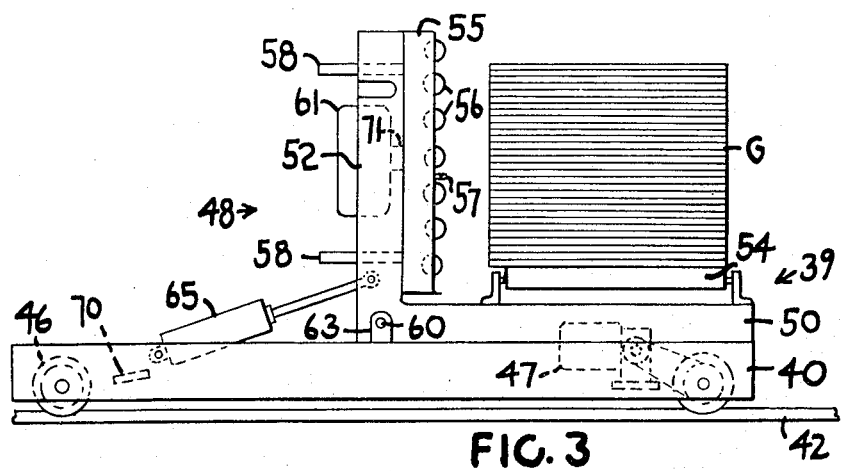
FIG. 3 is a side view of the device in FIG. 2 after the glass sheets have been stacked up.
Figure 4:
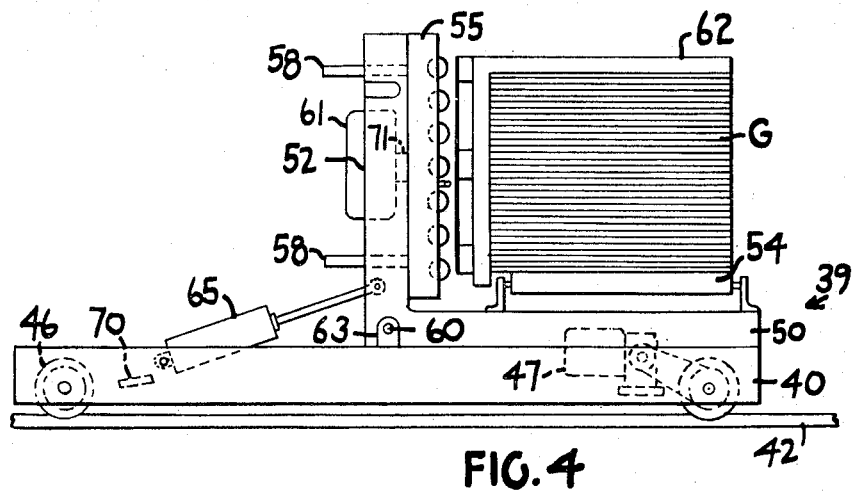
FIG. 4 is a side view of the device of FIG. 3 after an L-shaped pallet has been placed on the glass.
Figure 5:
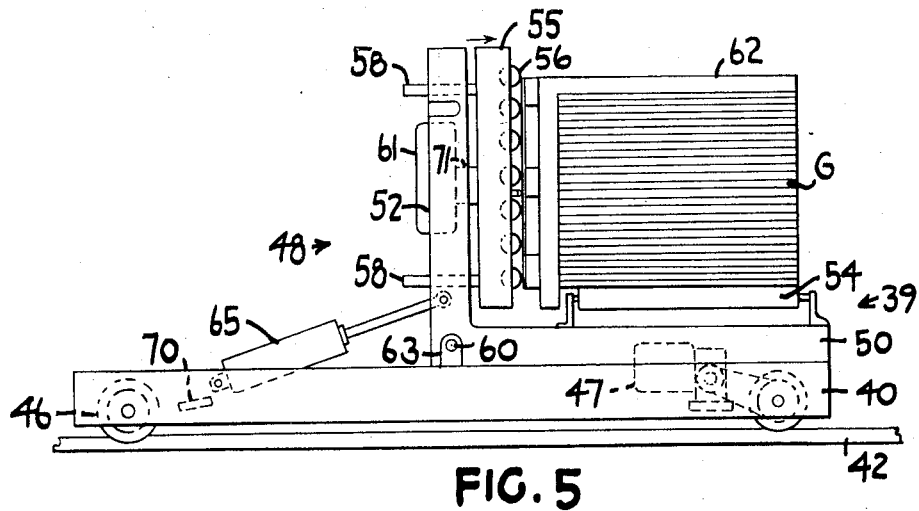
FIG. 5 is a side view of the device in FIG. 4 showing a platform in position to support the pallet.

FIG. 3 shows the turnover device 39 after the glass sheets have been stacked on the first section 50 of the L-shaped member 48. FIG. 4 shows the turnover device 39 after an L-shaped pallet 62 has been placed on the stacked glass sheets.

Glass sheets are normally handled and shipped in a vertical position to minimize damage to the glass. The glass, as viewed in FIG. 4, is not ready to be shipped. According to the present invention, the glass is rotated through an angle of at least 91° and preferably 95° so that it can be shipped in a substantially vertical position. This is accomplished by actuating, for example, a hydraulic cylinder 65 to rotate L-shaped member 48 about a stationary pivot 60, which is rigidly attached to carriage 40 by link 63. If the L-shaped member 48 were rotated in a counter-clockwise manner, as viewed in FIG. 4, L-shaped pallet 62 and glass G would shift to the left and therefore cause breakage of at least some of the glass G. To avoid this, platform 55 is moved to the right, as in FIG. 5, by a suitable actuating means, such as, for example, a cylinder 61. In operation, cylinder 61 is activated by the operator so that a large diameter piston 71 is extended (to the right in FIG. 5) causing platform 55 to move into engagement with the L-shaped frame 62. Pressure sensing switch 57 is in position to sense any contact of rolls 56 with the L-shaped frame 62, and movement of platform 55 is stopped, either manually or automatically, when this contact occurs. This is carried out before L-shaped member 48 is rotated.

Figure 6:
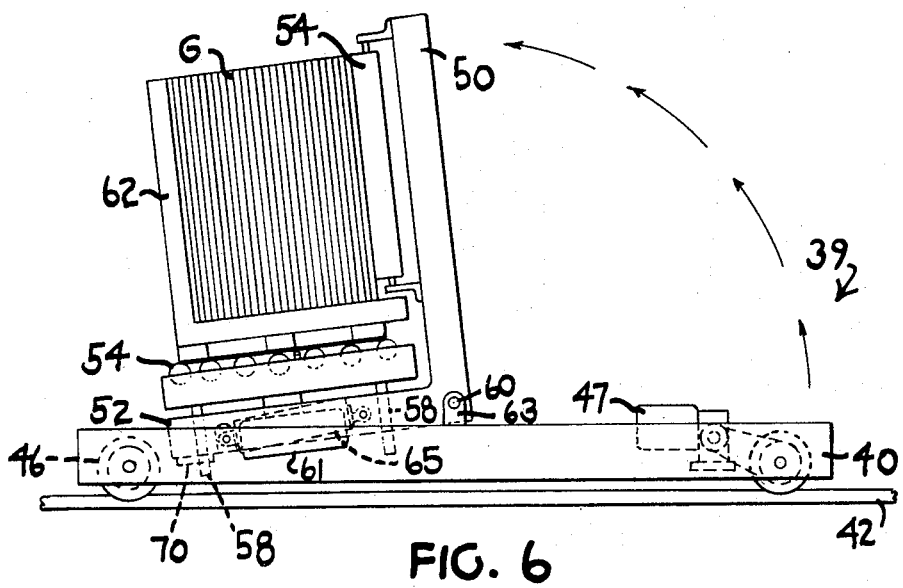
FIG. 6 is a side view of the device in FIG. 5 showing the device rotated from about 91° to 100°.

Referring to FIG. 6, there is shown the turnover device 39 after the L-shaped member 48 has been rotated between about 91° and 100°. It is very imporatnt that the glass be rotated more than 90° to enable gravity to help support the glass in an upright position with one major surface of the stack supported on a section of the L-shaped member 48 after pivoting the latter. If the glass were rotated 90° or less, gravity would tend to cause the pivoted glass stack to fall off of the L-skid or pallet. Stop means 70 are positioned in carriage 40 to stop rotation of the L-shaped member 48 when the desired degree of rotation is reached. While a range of 91° to 100° has been mentioned throughout this disclosure, it is conceivable to use an angle somewhat greater than 100°; however, this would make it extremely difficult for a conventional fork lift truck to pick up a stack of glass after it has been rotated. Taking this into consideration, an angle of about 95° is preferred.

The glass in the substantially vertical position can now be closed either on the carriage or at a different location after it has been moved by a fork lift truck.

It is also conceivable to rotate the stack of glass sheets through an angle of approximately 90°, but when such is done, additional means must be used to prevent the glass from falling off of L-shaped member 48 due to the gravitational effect. Such additional means could consist of strapping the glass prior to rotation (not shown). This is not as efficient as rotating the glass through an angle of about 91° to 100°. However, it will serve the same purpose, i.e., preventing the glass sheets from falling off of the L-shaped member 48 due to a gravitational effect, though possibly at a greater expense than in the preferred embodiment which relies on stop 70 to control the angle of rotation of L-shaped member 48 to keep the glass stacked on edge at an angle of from about 1° to 10°, and preferably 5°, from a vertical plane. In any case, it is important to provide means for preventing the glass from falling off of the L-shaped member 48 due to the gravitational effect.

It is also possible to rely on driven rolls 56 to carry the stack of glass G (while on edge) off of the turnover device 39 and onto a loading conveyor (not shown). This can be done either with platform 55 in the up position, as illustrated in FIG. 6, or in the down position (not shown).

I claim as my invention:
1. A method of packing glass sheets comprising:
orienting each of said sheets into a horizontal orientation,
stacking said sheets while in the horizontal orientation,
placing said stack of sheets while in said horizontal orientation on an L-shaped member such that a horizontal portion of said L-shaped member embraces the bottom of said stack and a vertical portion of said member resides closely adjacent a side thereof, placing an L-shaped frame about said sheets, said L-shaped frame having a vertical portion disposed intermediate said vertical portion of said L-shaped member and said side of said stack and a horizontal portion overlying the top of said stack, and rotating said L-shaped member about an angle of approximately 90° such that said vertical portion of said L-shaped member is in a relatively horizontal disposition beneath said stack and the intermediate disposed portion of said L-shaped frame.

2. A method according to claim 1 wherein said L-shaped member is rotated about an angle of from about 91° to 100°.

3. A method according to claim 2 wherein said L-shaped member is rotated about an angle of about 95°.

* * * * *